P. AND B. DE MATTIA.
RUBBER SHOE SOLE MAKING APPARATUS.
APPLICATION FILED JUNE 20, 1918.

1,311,856.

Patented July 29, 1919.

WITNESSES
Frederick Diehl.

INVENTORS
Peter DeMattia
Barthold DeMattia
BY
ATTORNEYS

UNITED STATES PATENT OFFICE.

PETER DE MATTIA AND BARTHOLD DE MATTIA, OF CLIFTON, NEW JERSEY.

RUBBER-SHOE-SOLE-MAKING APPARATUS.

1,311,856.	Specification of Letters Patent.	Patented July 29, 1919.

Application filed June 20, 1918. Serial No. 240,998.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Rubber-Shoe-Sole-Making Apparatus, of which the following is a full, clear, and exact description.

Among the principal objects which the present invention has in view are: to increase the effective capacity of a vulcanizing machine; to provide the vulcanized rubber and similar material from which soles of shoes may be made in forms economical in the use of the material; to provide a continuous sheet of material from which shoe soles may be formed, arranged to form the necessary "brakes" for the shanks of the shoes; to reduce the labor factor in the manufacture of soles such as described, and to facilitate the vulcanizing of the rubber composition for shoe soles.

*Drawings.*

*Description.*

Shoe soles of the character herein disclosed are constructed from vulcanized rubber or suitable substitute for the rubber. When completed they have a thickened portion which extends under the ball of the foot of the wearer and shaped to conform therewith, and a thin portion which extends under the arch of the foot to form what is known as the shank of the sole. An extension of this portion of the sole forms a rest or seat to which a heel of any suitable character is attached. Between the thin and thickened portions of the sole, the surface of the material is inclined to form what is known as a "break." The break usually extends diagonally across the sole. It is owing to the presence of this break and the need of the same extending across the sole at various angles, that the soles are independently molded, the rubber being shaped and disposed in layers in the mold. The packing of these molds in a vulcanizing chamber consumes considerable time, and thereby adds to the cost of construction and to the price of the product.

Figure 1:
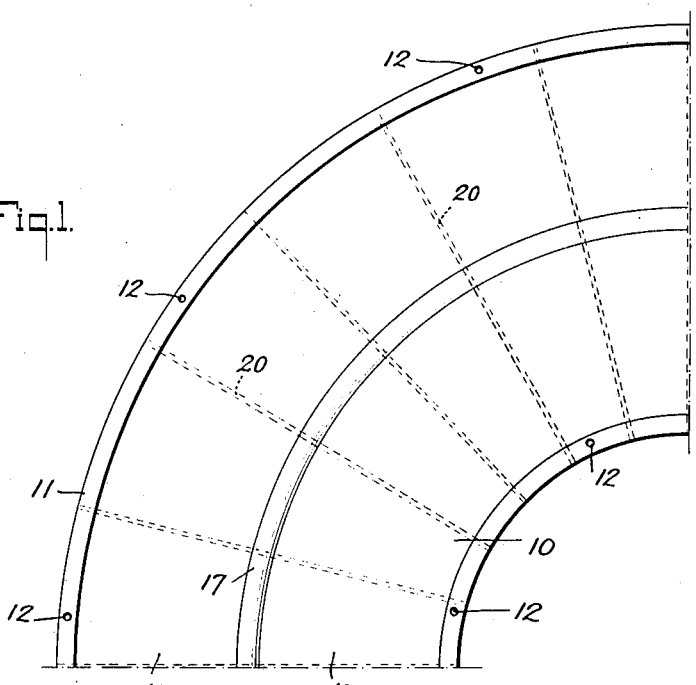
Figure 1 is a top plan view of a quarter section of a mold ring employed in the manufacture of composition rings from which the soles are constructed.
Figure 2:
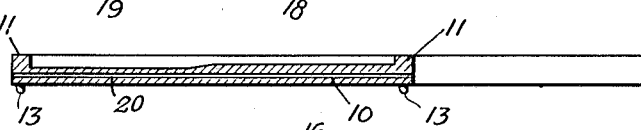
Fig. 2 is a cross section of the same.
Figure 3:
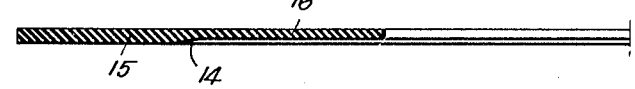
Fig. 3 is a cross section of the rubber ring formed on said mold.

The difficulties above mentioned are avoided in the present invention by producing a disk ring 9, the body whereof is constructed of approved materials disposed in ring molds 10 to be vulcanized. The molds 10, as seen best in Fig. 2, have each upstanding edges or flanges 11. The flanges 11 have a series of spotting sockets 12. The sockets 12 are adapted to receive buttons 13 extending from a super-imposed mold. To expedite the operation of heating the molds, each mold is furnished with a series of heat-circulating passages 20. These passages radiate from the central column formed by the molds when piled on one another, to the outer space surrounding the same. The passages 20 are disposed in any suitable arrangement and number.

When making a ring such as indicated by the numeral 9, the molds are individually piled one on the other to be pressed or otherwise fastened together as a continuous pile. By thus disposing the molds in column formation, the vulcanizing chamber is more compactly filled and a comparatively larger number of soles are handled. The circle formed by the molds materially aids in the distribution of the heat of the vulcanizing chamber. After the proper heat has been maintained for the desired period of time, the molds are removed and when cooled are opened to deliver the disk rings 9.

To form the breaks 14 in the disk rings between the sole or thickened portion 15 and the shank or thin portion 16, the mold 10 has an inclined section 17, which separates the raised section 18 and the lower section 19 of the said mold. The rings 9 resulting from the method of construction and the operation of the molds, have the breaks 14 approximately centrally located.

Figure 4:
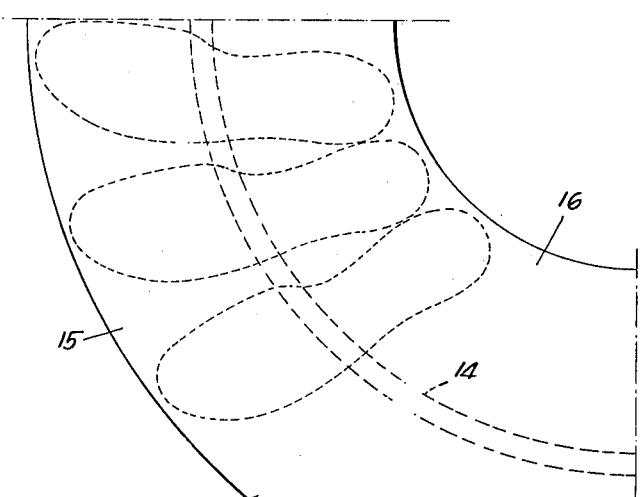
Fig. 4 is a top view of a quadrant segment of the composition ring formed in the mold shown in Fig. 1.

As best seen in Fig. 4 of the drawings, the soles may now be cut from the ring 9, the toe or forward portions thereof being adjacent the larger diameter of the ring, while the heel portions are disposed adjacent the inner diameter of the ring. The soles are cut from the ring by employing either cutting dies or any suitable severing tool.

It is obvious that the molds may be varied in correspondence with the product to be formed thereby.

Claims.

1. An apparatus as characterized comprising a plurality of circular ring molds having inner and outer raised flanges forming the periphery of said molds, and inner and outer sections of different thicknesses, and said sections being connected by an inclined section extending from the level of the thicker section to the level of the thinner section, said ring molds being adapted to be assembled to form a vertical pile, the center of said pile forming a cylindrical opening.

2. An apparatus as characterized comprising a plurality of circular ring molds having inner and outer raised flanges forming the periphery of said molds, and inner and outer sections of different thicknesses, the thicker section being adjacent the inner flange, and said sections being connected by an inclined section extending from the level of the thicker section outwardly to the level of the thinner section, said ring molds being adapted to be assembled to form a vertical pile the center of said pile forming a cylindrical opening, and each of said ring molds having a plurality of heat-circulating passages extending radially therefrom, said passages communicating with the cylindrical space formed by the assembled ring molds.

3. An apparatus as characterized comprising a plurality of circular ring molds, each having inner and outer raised flanges forming the periphery of said molds, and inner and outer sections of varying thicknesses, said sections being connected by an inclined section, said ring molds being adapted to form a vertical pile, the center of said pile forming a cylindrical opening, and each of said ring molds having a plurality of heat-circulating passages extending radially therefrom, said passages communicating with the cylindrical space formed by the assembled ring molds.

PETER DE MATTIA.
BARTHOLD DE MATTIA.